(12) United States Patent
Chaki et al.

(10) Patent No.: US 10,954,791 B2
(45) Date of Patent: Mar. 23, 2021

(54) BLADE REMOVAL DEVICE AND METHOD

(71) Applicant: Mitsubishi Hitachi Power Systems, Ltd., Kanagawa (JP)

(72) Inventors: Ryota Chaki, Kanagawa (JP); Tadakazu Sakaguchi, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 195 days.

(21) Appl. No.: 16/066,431

(22) PCT Filed: Jan. 10, 2017

(86) PCT No.: PCT/JP2017/000464
§ 371 (c)(1),
(2) Date: Jun. 27, 2018

(87) PCT Pub. No.: WO2017/122632
PCT Pub. Date: Jul. 20, 2017

(65) Prior Publication Data
US 2019/0003310 A1    Jan. 3, 2019

(30) Foreign Application Priority Data

Jan. 13, 2016 (JP) .............................. JP2016-004112

(51) Int. Cl.
*F04D 29/64* (2006.01)
*B23P 19/04* (2006.01)
(Continued)

(52) U.S. Cl.
CPC .............. *F01D 5/005* (2013.01); *B23P 19/04* (2013.01); *F01D 25/246* (2013.01);
(Continued)

(58) Field of Classification Search
CPC ...... F01D 5/005; F01D 25/285; F01D 25/246; F01D 9/042; F01D 5/3038; F01D 5/303;
(Continued)

(56) References Cited

U.S. PATENT DOCUMENTS

2012/0233837 A1    9/2012  Bartlam et al.
2015/0354597 A1*  12/2015  I .......................... F01D 25/246
                                                    415/209.3
2016/0333892 A1   11/2016  Hashimoto et al.

FOREIGN PATENT DOCUMENTS

EP    2 169 184    3/2010
EP    2 535 530    12/2012
(Continued)

OTHER PUBLICATIONS

Chinese Office Action dated Nov. 6, 2019 in corresponding CN Application No. 201780006248.0 with partial English Translation.
(Continued)

*Primary Examiner* — Lee A Holly
(74) *Attorney, Agent, or Firm* — Wenderoth, Lind & Ponack, L.L.P.

(57) ABSTRACT

A blade removal device for removing a blade in a circumferential direction of a blade ring along a groove, the blade being engaged with the groove extending in the circumferential direction on an inner peripheral side of the blade ring, is provided with a towing part for towing the blade, a string member connecting the towing part and the blade, and a first turning part attached to the blade ring so as to be in contact with a portion of the string member between the towing part and the blade to change a direction of a towing force transmitted via the string member.

20 Claims, 6 Drawing Sheets

(51) Int. Cl.
*F01D 5/00* (2006.01)
*F04D 29/52* (2006.01)
*F01D 25/28* (2006.01)
*F01D 25/24* (2006.01)
*F01D 9/04* (2006.01)
*F01D 5/30* (2006.01)

(52) U.S. Cl.
CPC .......... *F01D 25/285* (2013.01); *F04D 29/52* (2013.01); *F04D 29/64* (2013.01); *F01D 5/303* (2013.01); *F01D 5/3038* (2013.01); *F01D 5/3046* (2013.01); *F01D 9/042* (2013.01); *F05D 2220/30* (2013.01); *F05D 2230/70* (2013.01); *F05D 2240/12* (2013.01)

(58) Field of Classification Search
CPC .......... F01D 5/3046; F01D 9/04; F01D 25/00; F04D 29/64; F04D 29/52; B23P 19/04; F05D 2220/30; F05D 2230/70; F05D 2240/12; F02C 7/00
See application file for complete search history.

(56) References Cited

FOREIGN PATENT DOCUMENTS

| | | |
|---|---|---|
| EP | 3 023 590 | 5/2016 |
| JP | 2002-371805 | 12/2002 |
| JP | 2006-257966 | 9/2006 |
| JP | 2014-177888 | 9/2014 |
| JP | 2015-98848 | 5/2015 |
| JP | 2015-102037 | 6/2015 |
| WO | 2008/012195 | 1/2008 |

OTHER PUBLICATIONS

Extended European Search Report dated Aug. 2, 2019 in corresponding European Application No. 17738386.6.
International Search Report dated Apr. 11, 2017 in International (PCT) Application No. PCT/JP2017/000464.
Written Opinion of the International Searching Authority dated Apr. 11, 2017 in International (PCT) Application No. PCT/JP2017/000464.

* cited by examiner

BLADE REMOVAL DEVICE AND METHOD

TECHNICAL FIELD

The present disclosure relates to a blade removal device and method for removing a stationary vane from a blade ring.

BACKGROUND ART

There is conventionally known a blade removal device for removing a blade attached to a blade ring from the blade ring by moving the blade in a circumferential direction of the blade ring.

For instance, Patent Document 1 discloses a blade removal device including a jig body fixed to an outer peripheral part of a blade ring, a hook part attached to a stationary vane block, a string member connected to the hook part and the jig body, and a winding unit for drawing the string member toward the jig body. The hook part of the blade removal device of Patent Document 1 includes a hook to be inserted into a clearance between the stationary vane block and an isolation ring The hook part is fixed to the stationary vane block by engaging the hook part with the stationary vane block.

Patent Document 2 discloses a blade removal device in which a guide rail is attached to a blade ring, a movable bracket is attached to the guide rail or the blade ring, and the movable bracket is configured to be slidable by a hydraulic cylinder.

CITATION LIST

Patent Literature

Patent Document 1: JP2002-371805A
Patent Document 2: JP2006-257966A

SUMMARY

Problems to be Solved

However, the blade removal device described in Patent Document 1 is difficult to smoothly remove a blade from the blade ring in a case where the direction of the towing force from the winding unit is not coincident with the circumferential direction of the blade ring. Accordingly, it is necessary to shift the position of the winding unit serving as a towing part in response to movement of the blade to be removed.

The blade removal device described in Patent Document 2 is also difficult to smoothly remove a blade from the blade ring in a case where the direction of the towing force due to the hydraulic cylinder (cylinder axial direction of the hydraulic cylinder) is not coincident with the circumferential direction of the blade ring. Accordingly, it is necessary to shift the position of the hydraulic cylinder serving as a towing part in response to movement of the blade to be removed.

In view of the above circumferences, an object of at least some embodiments of the present invention is to provide a blade removal device and method capable of smoothly removing a blade, regardless of the change in positional relation of a towing part of the blade removal device relative to the blade to be removed.

Solution to the Problems (1) A blade removal device according to at least some embodiments of the present invention is a blade removal device for removing a blade in a circumferential direction of a blade ring along a groove, the blade being engaged with the groove extending in the circumferential direction on an inner peripheral side of the blade ring, the device comprising: a towing part for towing the blade; a string member connecting the towing part and the blade; and a first turning part attached to the blade ring so as to be in contact with a portion of the string member between the towing part and the blade to change a direction of a towing force transmitted via the string member.

With the above configuration (1), the direction of the towing force due to the towing part is changed by the first turning part and then transmitted to the blade. Thus, by locating the first turning part at a proper position relative to the blade to be removed, it is possible smoothly remove the blade, regardless of the change in positional relation of the towing part relative to the blade to be removed. That is, if the first turning part is located at a position where a straight line connecting the blade to be removed and the first turning part runs along the circumferential direction of the blade ring, the direction of the towing force transmitted to the blade to be removed via the first turning part extends along the circumferential direction of the blade ring, which makes it possible to smoothly remove the blade.

(2) In some embodiments, in the above configuration (1), the first turning part is configured to change the direction of the towing force transmitted to the blade via the string member from a first towing direction along the string member between the towing part and the first turning part to a second towing direction along the string member between the first turning part and the blade, and the second towing direction is closer to a tangential direction of the blade ring than the first towing direction is.

With the above configuration (2), a tensile force which directly acts on the blade is made approximate to the tangential direction or consistent with the tangential direction, and thereby it is possible to smoothly remove the blade. That is, when the blade removal device with the above configuration (1) is used, the blade is removed in the circumferential direction along the groove which extends in the circumferential direction of the blade ring. In this connection, in the above configuration (2), the second towing direction along the string member between the first turning part and the blade is made closer to the tangential direction of the blade ring than the first towing direction is. This makes the direction of the tensile force which directly acts on the blade approximate to or consistent with a removal direction in which the blade is pulled out. Thus, the towing force due to the towing part is effectively used for removing the blade, and force components in directions other than the removal direction of the blade are reduced. Consequently, it is possible to more smoothly remove the blade.

(3) In some embodiments, in the above configuration (1) or (2), the first turning part is engaged with a recessed groove formed along the circumferential direction in the blade ring or in an isolation ring mounted to the blade ring, and the first turning part is configured so as to be movable along the circumferential direction.

With the above configuration (3), since the first turning part is configured to be movable along the circumferential direction of the blade ring while the first turning part is engaged with the blade ring or an isolation ring mounted to the blade ring, it is possible to easily move the first turning part. Consequently, it is possible to improve the efficiency of the removal operation, compared with a case where the first turning part is attached or detached, for instance by welding, each time when the first turning part is moved. For instance, it is possible to easily move the first turning part to a position where, as described in the above configuration (2), the second towing direction is closer to the tangential direction of the blade ring than the first towing direction is, in accordance with movement of the blade ring.

(4) In some embodiments, in any one of the above configurations (1) to (3), the first turning part is attached on an inner peripheral side of the blade ring so that the string member is positioned within a region where the blade is present in an axial direction of the blade ring.

With the above configuration (4), the first turning part is attached to the inner peripheral side of the blade ring, and thus it is possible to arrange the first turning part and the blade in substantially the same level in the axial direction of the blade ring. Consequently, the direction of the straight line connecting the blade and the first turning part (towing direction of the blade) can be made along the circumferential direction of the blade ring (movement direction of the blade), compared with a case where the first turning part is attached to a side wall surface of the blade ring, and it is possible to much more smoothly remove the blade.

(5) In some embodiments, in any one of the above configurations (1) to (4), the first turning part is a rotatable pulley configured to be in contact with the string member.

With the above configuration (5), it is possible to reduce friction between the string member and the first turning part when the blade is removed, and it is possible to improve the durability of the blade removal device.

(6) In some embodiments, in any one of the above configurations (1) to (5), the blade removal device further comprises a frame attached to the blade ring so as to bridge both ends of the blade ring which has been divided into an arc segment, the frame supporting the towing part.

With the above configuration (6), the towing part is supported to the frame attached to the divided blade ring, and thus the reaction force which acts on the towing part (reaction force to the tensile force of the blade) can be received by the frame. This enables the blade to be removed while ensuring loading balance which acts on the blade ring, without strongly fixing the blade ring to a base or the like.

(7) In some embodiments, in the above configuration (6), the frame includes: a pair of strut parts respectively connected to both ends of the blade ring; and a support rod disposed so as to bridge the pair of strut parts and supporting the towing part.

With the above configuration (7), the towing part supported by the support rod can be made away from the ends of the blade ring by the pair of strut parts. Thus, it is possible to smoothly remove the blade even if the blade reaches a position close to the ends of the blade ring.

(8) In some embodiments, in the above configuration (7), the towing part is configured to be slidable along the support rod.

With the above configuration (8), sliding the towing part in accordance with the position of the first turning part prevents excessive load from being applied to the frame.

(9) In some embodiments, in the above configuration (8), the towing part is positioned so that a first towing direction along the string member between the towing part and the first turning part extends along the strut parts.

With the above configuration (9), the force applied to the strut parts from the towing part is directed along an axial direction of the strut parts, and thereby it is possible to prevent excessive load from being applied to the strut parts.

(10) In some embodiments, in any one of the above configurations (6) to (9), the blade removal device further comprises a second turning part attached to the frame so as to be in contact with a portion of the string member between the towing part and the first turning part to change the direction of the towing force transmitted via the string member.

With the above configuration (10), the second turning part attached to the frame improves the flexibility of orientation of the towing part and reduces a space required for installing the towing part, thus making the frame compact, compared with a case without the second turning part.

(11) In some embodiments, in any one of the above configurations (1) to (10), the blade removal device further comprises a third turning part attached to one end of the blade ring in the circumferential direction so as to be in contact with a portion of the string member between the towing part and the first turning part to change the direction of the towing force transmitted via the string member.

With the above configuration (11), the third turning part attached to the circumferential end of the blade ring comes into contact with a portion of the string member between the towing part and the first turning part, and thereby the direction of the towing force transmitted through a portion of the string member from the third turning part to the blade can be kept within a proper range, regardless of the position of the blade. Thus, it is unnecessary to move the towing part in accordance with movement of the blade along the blade ring, and it is possible to efficiently conduct the blade removal operation.

(12) A blade removal method according to at least some embodiments of the present invention is a blade removal method for removing a blade in a circumferential direction of a blade ring along a groove, the blade being engaged with the groove extending in the circumferential direction on an inner peripheral side of the blade ring, the method comprising: a string member connection step of connecting the blade and a towing part for towing the blade with a string member; a first turning part attachment step of attaching a first turning part, configured to change a direction of a towing force transmitted via the string member, to the blade ring so as to be in contact with a portion of the string member between the towing part and the blade; and a blade movement step of generating the towing force by the towing part and thereby moving the blade in the circumferential direction.

With the above method (12), the direction of the towing force due to the towing part is changed by the first turning part and then transmitted to the blade. Thus, by locating the first turning part at a proper position relative to the blade to be removed, it is possible smoothly remove the blade, regardless of the change in positional relation of the towing part relative to the blade to be removed.

(13) In some embodiments, in the above method (12), in the first turning part attachment step, the first turning part is attached to the blade ring so that the towing force is turned from a first towing direction along the string member between the towing part and the first turning part to a second towing direction along the string member between the first turning part and the blade, and the second towing direction is closer to a tangential direction of the blade ring than the first towing direction is.

With the above method (13), a tensile force which directly acts on the blade is made approximate to the tangential direction or consistent with the tangential direction, and thereby it is possible to smoothly remove the blade.

Further, since the blade is pulled by the towing part via the first turning part, it is possible to make the second towing direction approximate to the tangential direction, regardless of the position of the towing part.

(14) In some embodiments, in the above method (12) or (13), the method further comprises a first turning part movement step of moving the first turning part along the circumferential direction in accordance with movement of the blade in the blade movement step, wherein the blade movement step is repeated after the first turning part movement step.

With the above method (14), the first turning part is moved in the circumferential direction in accordance with movement of the blade. Thus, by locating the first turning part at a proper position in accordance with the position of the blade, it is possible to smoothly remove the blade when the blade is moved again.

(15) In some embodiments, in the above method (14), the blade removal method further comprises a third turning part attachment step of attaching a third turning part, configured to change the direction of the towing force transmitted via the string member, to one end of the blade ring in the circumferential direction so as to be in contact with a portion of the string member between the towing part and the first towing part, wherein the first turning part movement step is performed in a state where the third turning part is attached to the one end of the blade ring after the third turning part attachment step.

With the above method (15), by attaching the third turning part to the circumferential end of the blade ring so as to be in contact with a portion of the string member between the towing part and the first turning part, the direction of the towing force transmitted through a portion of the string member from the third turning part to the blade can be kept within a proper range, regardless of the position of the blade. Thus, by moving the first turning part accordance with movement of the blade while the third turning part is attached to the circumferential end of the blade ring, it is possible to appropriately remove the blade without moving the towing part in accordance with movement of the blade along the blade ring.

(16) In some embodiments, in any one of the above methods (12) to (15), the method further comprises a frame attachment step of attaching a frame supporting the towing part to the blade ring so as to bridge both ends of the blade ring which has been divided into an arc segment.

With the above method (16), since a frame supporting the towing part is attached to the divided blade ring, the reaction force which acts on the towing part (reaction force to the tensile force of the blade) can be received by the frame. This enables the blade to be removed while ensuring loading balance which acts on the blade ring, without strongly fixing the blade ring to a base or the like.

(17) In some embodiments, in the above method (16), the frame includes: a pair of strut parts respectively connected to both ends of the blade ring; and a support rod disposed so as to bridge the pair of strut parts and supporting the towing part, and the method further comprises a towing part positioning step of moving the towing part along the support rod and positioning the towing part in accordance with a position of the blade.

With the above method (17), the towing part supported by the support rod can be made away from the ends of the blade ring by the pair of strut parts. Thus, it is possible to smoothly remove the blade even if the blade reaches a position close to the ends of the blade ring.

In addition, moving and positioning the towing part in accordance with the position of the blade prevents excessive load from being applied to the frame.

(18) In some embodiments, in the above method (16) or (17), the blade removal method further comprises a second turning part attachment step of attaching a second turning part, configured to change the direction of the towing force transmitted via the string member, to the frame so as to be in contact with a portion of the string member between the towing part and the first turning part.

With the above method (18), the second turning part attached to the frame improves the flexibility of orientation of the towing part and reduces a space required for installing the towing part, thus making the frame compact, compared with a case without the second turning part.

(19) In some embodiments, in any one of the above methods (12) to (18), a subject to be removed from the blade ring is a stationary vane block including a plurality of stationary vanes, the method further comprises a locking member installment step of installing a locking member between adjacent stationary vanes of the stationary vane block so that the locking member at least partially projects from between the adjacent stationary vanes, and in the string member connection step, the string member is connected to the stationary vane block on a blade root side of the stationary vanes from a projection of the locking member.

In the above method (19), before the blade is removed from the towing part, the locking member is installed between the adjacent stationary vanes, and the string member is connected to the stationary vane block on a blade root side of the stationary vanes from a projection of the locking member. Thus, it is possible to prevent the string member from detaching from the blade when the blade is pulled by the towing part.

Advantageous Effects

According to at least some embodiments of the present invention, the direction of the towing force due to the towing part is changed by the first turning part and then transmitted to the blade. Thus, by locating the first turning part at a proper position relative to the blade to be removed, it is possible smoothly remove the blade, regardless of the change in positional relation of the towing part relative to the blade to be removed.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

Figure 1:
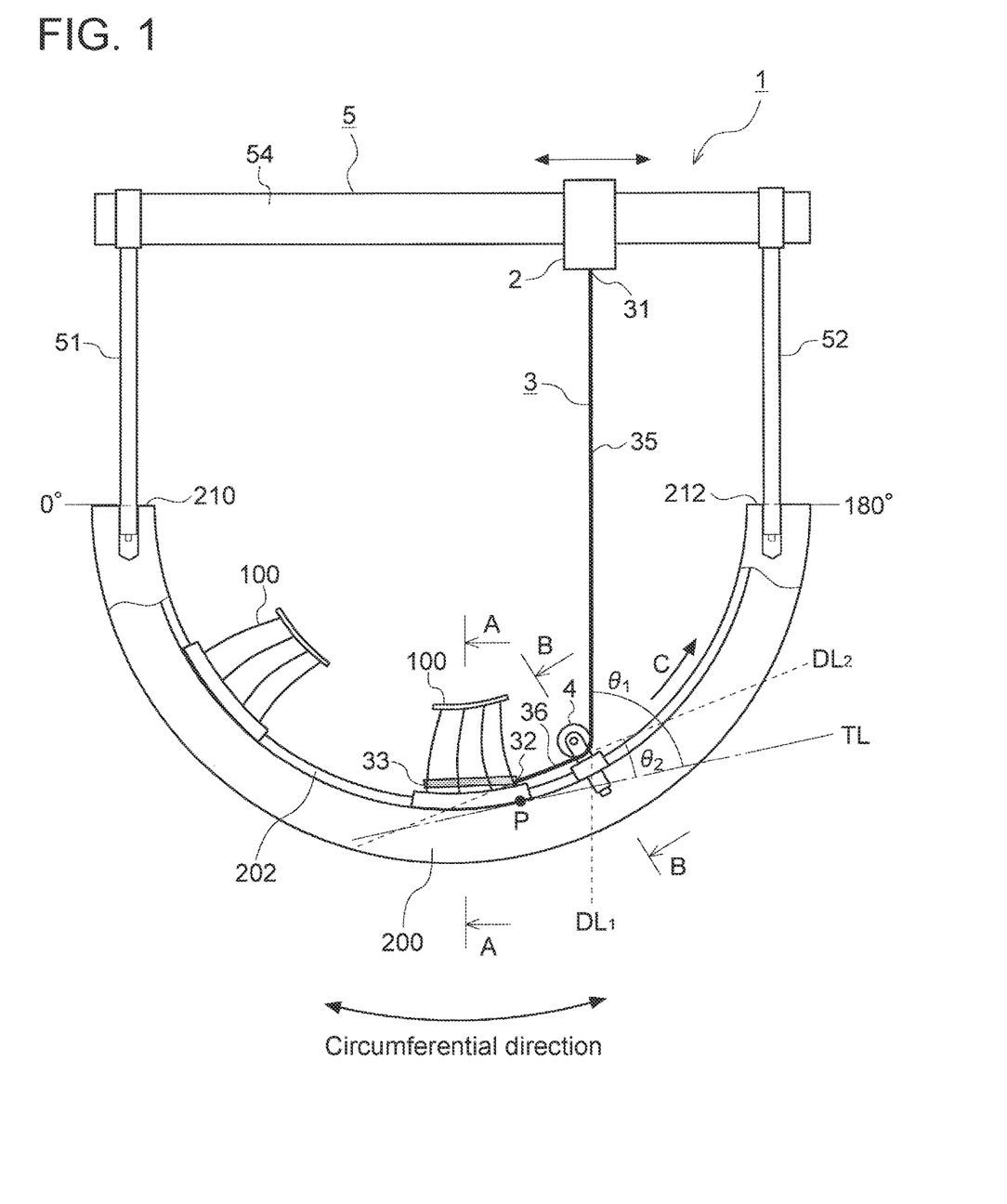
FIG. 1 is an overall configuration diagram showing a blade removal device to which a blade ring is attached according to an embodiment.
Figure 2:
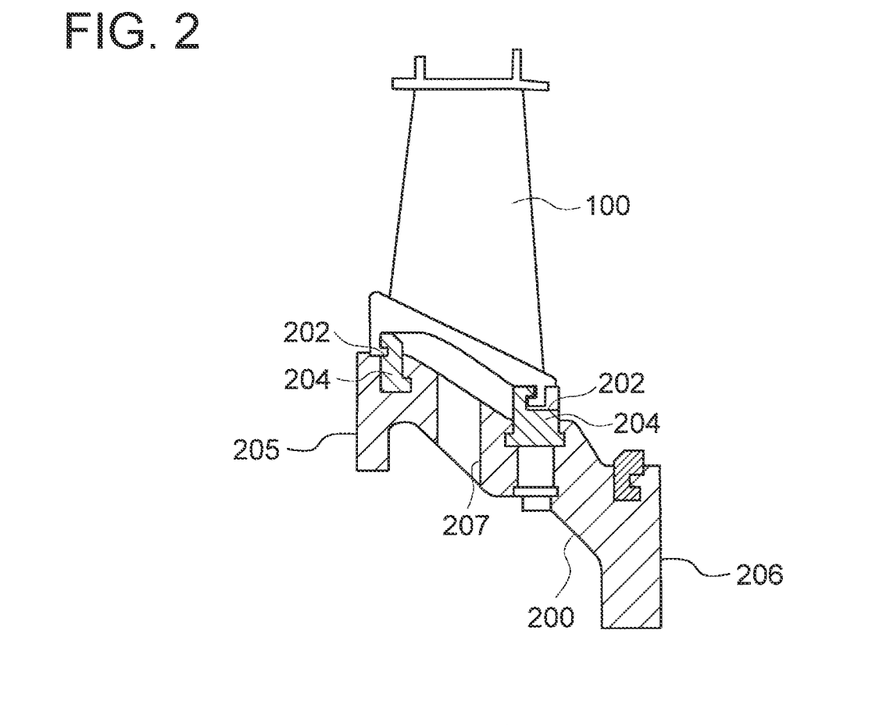
FIG. 2 is a cross-sectional view of the blade ring to which a blade is attached, taken along line A-A in FIG. 1, according to an embodiment.
Figure 3:
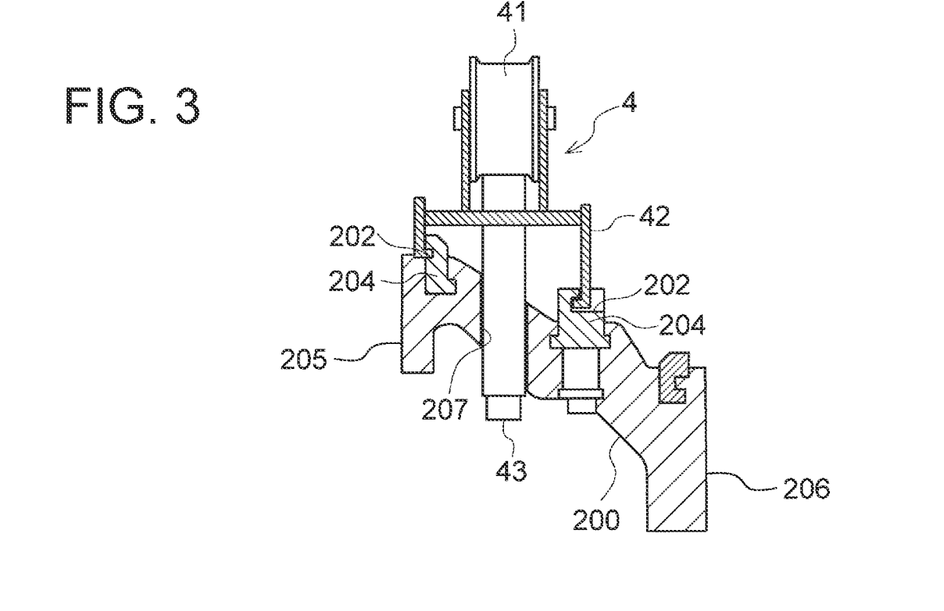
FIG. 3 is a cross-sectional view of the blade ring to which a first turning part is attached, taken along line B-B in FIG. 1, according to an embodiment.

First, with reference to FIGS. 1 to 3, an overall configuration of a blade removal device 1 according to some embodiments will be schematically described.

FIG. 1 is an overall configuration diagram showing a blade removal device 1 to which a blade ring 200 is attached according to an embodiment. FIG. 2 is a cross-sectional view of the blade ring 200 to which a blade 100 is attached, taken along line A-A in FIG. 1, according to an embodiment. FIG. 3 is a cross-sectional view of the blade ring 200 to which a first turning part 4 is attached, taken along line B-B in FIG. 1, according to an embodiment.

The illustrated blade removal device 1 is suitable for removing a blade 100 attached to a rotating machine such as a compressor or a turbine, including a gas turbine and a steam turbine.

In FIGS. 1 and 2, a stationary vane is shown as an example of the blade 100 to be removed. Specifically, as shown in FIG. 2, the blade (stationary vane) 100 is engaged with a groove 202 of an isolation ring 204 mounted to an inner peripheral side of the blade ring 200. The groove 202 of the isolation ring 204 extends along a circumferential direction of the blade ring 200. More specifically, on the inner peripheral side of the blade ring 200, two isolation rings 204 are mounted at positions different in an axial direction of the blade ring 200 (hereinafter, simply referred to as "axial direction"). These two isolation rings 204 are each provided with a groove 202 which extends along the circumferential direction of the blade ring 200. These two grooves 202 are configured to be engaged with a base part of the blade 100.

The blade 100 to be removed, the blade ring 200, or the groove 202 is not limited to the above configuration. For instance, the isolation ring 204 may not be mounted to the blade ring 200. The groove 202 to be engaged with the blade 100 may be formed in the blade ring 200 itself.

As exemplified in FIGS. 1 and 3, the blade removal device 1 according to some embodiments is a device for removing a blade 100, engaged with the groove 202 extending in the circumferential direction of the blade ring 200 (hereinafter, simply referred to as "circumferential direction") on the inner peripheral side of the blade ring 200, in the circumferential direction along the groove 202.

The blade removal device 1 includes a towing part 2 for towing the blade 100, a string member 3 connecting the towing part 2 and the blade 100, and a first turning part 4 for changing a direction of a towing force transmitted via the string member 3.

In this configuration, the first turning part 4 is attached to the blade ring 200 so as to be in contact with a portion of the string member 3 between the towing part 2 and the blade 100.

Specifically, a first end 31 of the string member 3 is attached to the towing part 2, and a second end 32 opposite to the first end 31 is connected to the blade 100 via a connection part 33. The first turning part 4 is in contact with a portion between the first end 31 and the second end 32 of the string member 3. Thus, when the blade 100 is moved along the blade ring 200, the string member 3 is bent or curved around the first turning part 4. That is, the direction of the towing force transmitted via the string member 3 is changed by the first turning part 4.

In the above embodiment, the direction of the towing force due to the towing part 2 is changed by the first turning part 4 and then transmitted to the blade 100. Thus, by locating the first turning part 4 at a proper position relative to the blade 100 to be removed, it is possible smoothly remove the blade 100, regardless of the change in positional relation of the towing part 2 relative to the blade 100 to be removed. That is, if the first turning part 4 is located at a position where a straight line connecting the blade 100 to be removed and the first turning part 4 runs along the circumferential direction of the blade ring 200, the direction of the towing force transmitted to the blade 100 to be removed via the first turning part 4 extends along the circumferential direction of the blade ring 200, which makes it possible to smoothly remove the blade 100.

For instance, the blade 100 attached to the blade ring 200 is generally movable along the circumferential direction of the blade ring 200. However, if the blade 100 is exposed to a high-temperature atmosphere, the blade 100 fixedly adheres to the blade ring 200 (or the isolation ring 204), which makes the blade 100 difficult to move along the blade ring 200. In the above embodiment, since the blade 100 can be smoothly removed, it is also suitable in the case where the blade 100 adheres to the blade ring 200 (or the isolation ring 204).

Examples of the string member 3 include a string (sling), rope, and wire, which may be formed of a synthetic fiber or a metal wire material. The string member 3 may be, for instance, a string (sling) made of a nylon fiber. In the string member 3, a material between the first end 31 and the second end 32 may be different from a material of the connection part 33 connected to the blade 100.

The towing part 2 may be, for instance, a chain block, a lever hoist, a crane, or a hoist.

In the embodiment shown in FIG. 1, the first turning part 4 is configured to change the direction of the towing force transmitted to the blade 100 via the string member 3, from a first towing direction $DL_1$ along the string member 3 (namely, a first portion 35 of the string member 3) between the towing part 2 and the first turning part 4 to a second towing direction $DL_2$ along the string member 3 (namely, a second portion 36 of the string member 3) between the first turning part 4 and the blade 100.

The second towing direction $DL_2$ is closer to a tangential direction of the blade ring 200 than the first towing direction $DL_1$ is. For instance, an angle $\theta_2$ between the second towing direction $DL_2$ and a tangential direction TL at a radial position P corresponding to a junction (second end 32) between the blade 100 and the string member 3 is smaller than an angle $\theta_1$ between the first towing direction $DL_1$ and the tangential direction TL.

In the above embodiment, a tensile force which directly acts on the blade 100 is made approximate to the tangential direction or consistent with the tangential direction, and thereby it is possible to smoothly remove the blade. That is, as described above, the blade 100 is removed in the circumferential direction along the groove 202 which extends in the circumferential direction of the blade ring 200. In this connection, in the above embodiment, the second towing direction $DL_2$ along the string member 3 (namely, the second portion 36 of the string member 3) between the first turning part 4 and the blade 100 is made closer to the tangential direction of the blade ring 200 than the first towing direction $DL_1$ is. This makes the direction of the tensile force which directly acts on the blade 100 approximate to the removal direction C of the blade 100 or consistent with the removal direction C of the blade 100. Thus, the towing force due to the towing part 2 is effectively used for removing the blade 100, and force components in directions other than the removal direction of the blade 100 are reduced. Consequently, it is possible to more smoothly remove the blade 100.

Additionally, as shown in FIG. 3, the first turning part 4 may be engaged with a recessed groove 202 formed, along the circumferential direction, in the blade ring 200 or in the isolation ring 204 mounted to the blade ring 200 so as to be movable along the circumferential direction.

In the embodiment shown in FIG. 3, the recessed groove 202 engaged with the first turning part 4 is the same as the above-described groove 202 engaged with the blade 100. In this case, when the blade 100 is removed, the first turning part 4 and the blade 100 are engaged with the same recessed groove (groove) 202 at positions different in the circumferential direction. This configuration eliminates an additional recessed groove 202 engaged with the first turning part 4.

The recessed groove engaged with the first turning part 4 and the groove engaged with the blade 100 may be separate grooves.

Conventionally, when a blade adhering to a blade ring is removed, for instance, a pedestal of a lever hoist (towing part) is welded to a buried table, and the lever hoist is installed on the pedestal. However, when the blade is pulled along a movement direction of the blade, it is necessary to shift the position of the lever hoist in accordance with the position of the blade. In the case where the pedestal of the lever hoist is welded to the buried table, it is necessary to detach the pedestal from the buried table and re-weld the pedestal to a different position in accordance with movement of the blade, which complicates the workability of removing the blade.

In this regard, the above configuration, in which the first turning part 4 is configured to be movable along the circumferential direction of the blade ring 200, allows the first turning part 4 to be easily moved. Consequently, it is possible to improve the efficiency of the removal operation, compared with a case where the first turning part 4 is attached or detached, for instance by welding, each time when the first turning part 4 is moved. For instance, it is possible to easily move the first turning part 4 to a position where, as described above, the second towing direction is closer to the tangential direction of the blade ring 200 than the first towing direction is, in accordance with movement of the blade ring 200.

As shown in FIG. 3, in a state where the first turning part 4 is engaged with the recessed groove 202, a base part 43 of the first turning part 4 may be inserted into an opening 207 of the blade ring 200.

Figure 4:
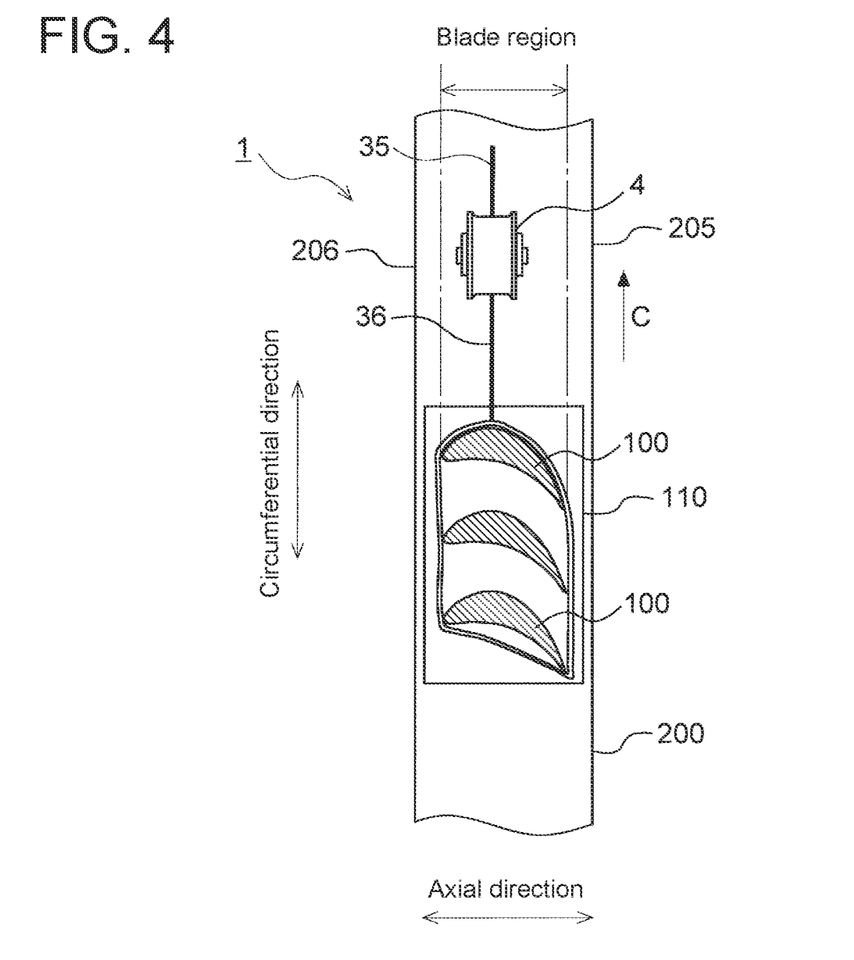
FIG. 4 is a diagram for describing the positional relation between a blade and a first turning part according to an embodiment.

FIG. 4 is a diagram for describing the positional relation between the blade 100 and the first turning part 4 according to an embodiment.

As shown in FIG. 4, the first turning part 4 may be attached to an inner peripheral side of the blade ring 200 so that the string member 3 is positioned within a region (blade region) where the blade 100 is present in an axial direction of the blade ring 200. Meanwhile, the first turning part 4 is disposed so that at least the second portion 36 of the string member 3 is positioned within the blade region. Of course, the first turning part 4 may be disposed so that both the first portion 35 and the second portion 36 of the string member 3 are positioned within the blade region.

With the above configuration, the first turning part 4 is attached to the inner peripheral side of the blade ring 200, and thus it is possible to arrange the first turning part 4 and the blade 100 in substantially the same level in the axial direction of the blade ring 200. Consequently, the direction of the straight line connecting the blade 100 and the first turning part 4 (second towing direction of the blade 100) can be made consistent with the circumferential direction of the blade ring 200 (movement direction of the blade 100), compared with a case where the first turning part 4 is attached to a side wall surface 205, 206 of the blade ring 200, and it is possible to much more smoothly remove the blade.

As shown in FIGS. 1 and 3, the first turning part 4 may be a rotatable pulley configured to be in contact with the string member 3.

With this configuration, it is possible to reduce friction between the string member 3 and the first turning part 4 when the blade 100 is removed, and it is possible to improve the durability of the blade removal device 1.

In other embodiments, the first turning part 4 may be in another form, such as a sliding member (e.g., shoe) composed of a low-friction member.

As shown in FIG. 1, the blade removal device 1 according to some embodiments is attached to the blade ring 200 so as to bridge both ends 210, 212 of the blade ring 200 which has been divided into an arc segment, and the blade removal device 1 further includes a frame 5 supporting the towing part 2.

In this way, when the towing part 2 is supported to the frame 5 attached to the divided blade ring 200, the reaction force which acts on the towing part 2 (reaction force to the tensile force of the blade 100) can be received by the frame 5. This enables the blade 100 to be removed while ensuring loading balance which acts on the blade ring 200, without strongly fixing the blade ring 200 to a base or the like.

In an embodiment, the frame 5 includes a pair of strut parts 51, 52 respectively connected to both ends 210, 212 of the blade ring 200, and a support rod 54 disposed so as to bridge the pair of strut parts 51, 52 and supporting the towing part 2.

This enables the towing part 2 supported by the support rod 54 to be away from the ends 210, 212 of the blade ring 200 by the pair of strut parts 51, 50. Thus, it is possible to smoothly remove the blade 100 even if the blade 100 reaches a position close to the ends 210, 212 of the blade ring 200.

Specifically, the pair of strut parts 51, 52 is provided parallel to each other, and the support rod 54 is oriented in a direction orthogonal to a direction of extending the strut parts 51, 52. That is, the frame 5 has a portal shape. Each strut part 51, 52 may be fastened to the corresponding end 210, 212 of the blade ring 200 with a bolt. In this case, when the blade ring 200 is assembled, each strut part 51, 52 may be fastened to the end 210, 212 of the blade ring 200 with a bolt using a bolt hole for connecting sections of the divided blade ring 200.

However, the configuration of the frame 5 is not limited thereto. The frame 5 may have another shape, for instance, trapezoidal, inverted trapezoidal, curved U-shape or C-shape.

In the above embodiment, the towing part 2 may be configured so as to be slidable along the support rod 54.

Sliding the towing part 2 in accordance with the position of the first turning part 4 prevents excessive load from being applied to the frame 5.

The towing part 2 may be positioned so that the first towing direction $DL_1$ is in conformance with the strut parts 51, 52.

With this configuration, the force applied to the strut parts 51, 52 from the towing part 2 is directed along an axial direction of the strut parts 51, 52, and thereby it is possible to prevent excessive load from being applied to the strut parts 51, 52.

Figure 5:
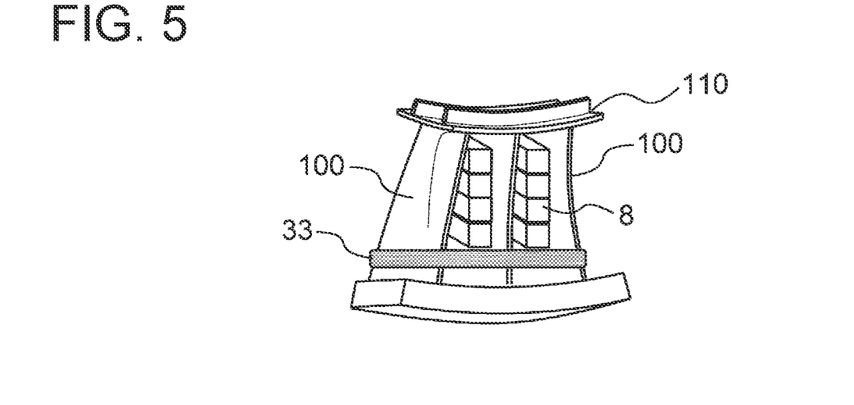
FIG. 5 is a configuration diagram of a stationary vane block and a locking member according to an embodiment.
Figure 6:
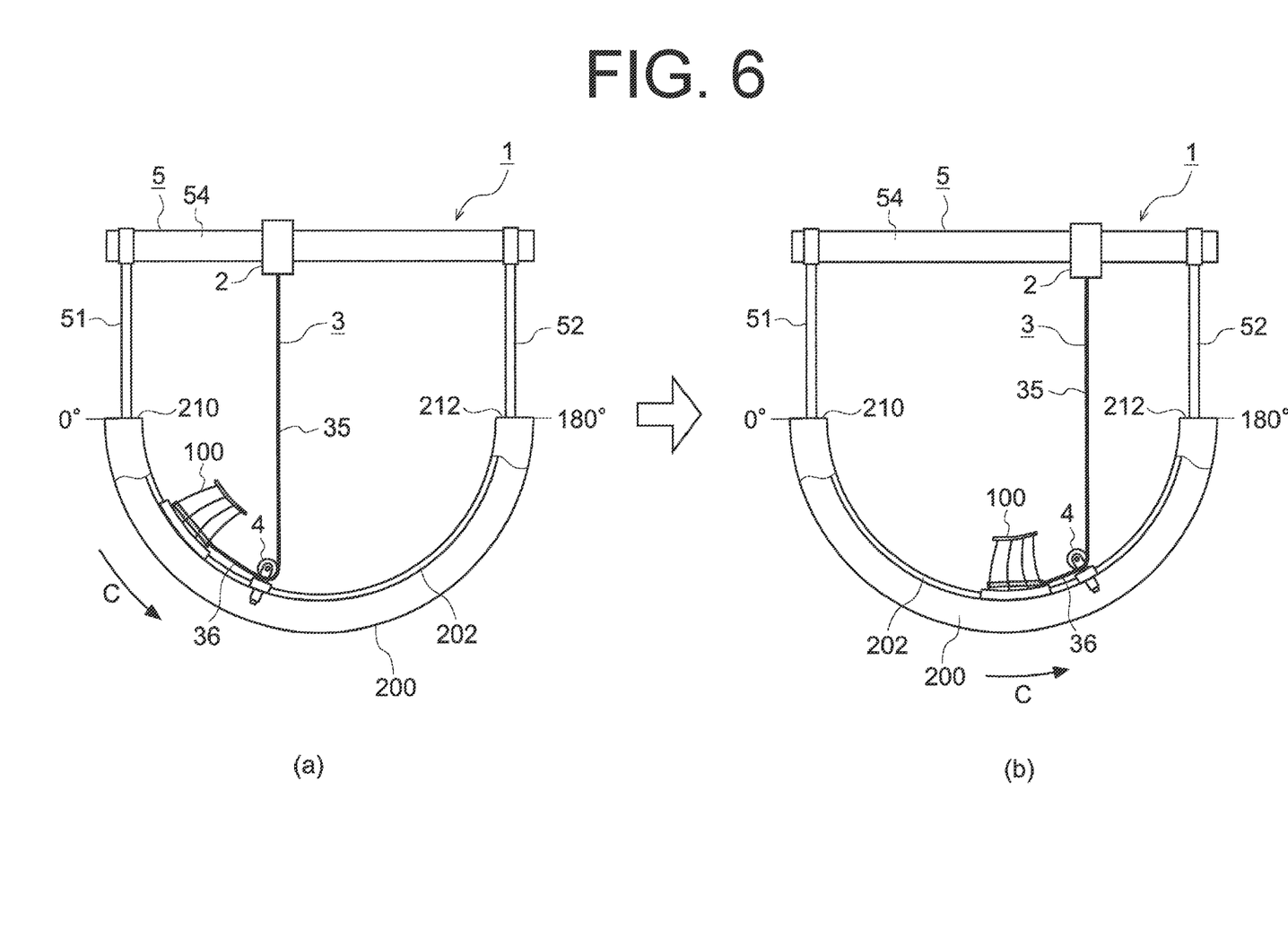
FIG. 6 is a diagram for describing a blade removal method according to an embodiment.

Next, with reference to FIGS. 5 and 6, a blade removal method according to some embodiments will be described. FIG. 5 is a configuration diagram of a stationary vane block 110 and a locking member 8 according to an embodiment. FIG. 6 is a diagram for describing a blade removal method according to an embodiment.

In the following example, reference numerals shown in FIGS. 1 to 4 are used where appropriate.

In some embodiments, the blade removal method is a method for removing the blade 100, engaged with the groove 202 extending in the circumferential direction of the blade ring 200 on the inner peripheral side of the blade ring 200, in the circumferential direction along the groove 202.

This blade removal method includes a string member connection step of connecting the blade 100 and the towing part 2, a first turning part attachment step of attaching the first turning part 4 to the blade ring 200, and a blade movement step of moving the blade in the circumferential direction.

In the string member connection step, the blade 100 and the towing part 2 for towing the blade 100 are connected by the string member 3.

In the blade movement step, a towing force is generated by the towing part 2, and the blade is thereby moved in the circumferential direction. Generally, since blades 100 are densely arranged at the blade ring 200 in the circumferential direction, the blade 100 can be moved in only one-way in the circumferential direction during the removal operation of the blade 100.

In the first turning part attachment step, the first turning part 4, configured to change the direction of the towing force transmitted via the string member 3, is attached to the blade ring 200 so as to be in contact with a portion of the string member 3 between the towing part 2 and the blade.

Additionally, in the first turning part attachment step, the first turning part 4 may be attached to the blade ring 200 so that the towing force is turned from a first towing direction along the first portion 35 of the string member 3 between the towing part 2 and the first turning part 4 to a second towing direction along the second portion 36 of the string member 3 between the first turning part 4 and the blade 100. In this case, the second towing direction is closer to a tangential direction of the blade ring 200 than the first towing direction is.

With this configuration, a tensile force which directly acts on the blade 100 is made approximate to the tangential direction or consistent with the tangential direction, and thereby it is possible to smoothly remove the blade 100.

Further, since the blade 100 is pulled by the towing part 2 via the first turning part 4, it is possible to make the second towing direction approximate to the tangential direction easily, regardless of the position of the towing part 2.

With the above method, the direction of the towing force due to the towing part 2 is changed by the first turning part 4 and then transmitted to the blade. Thus, by locating the first turning part 4 at a proper position relative to the blade 100 to be removed, it is possible smoothly remove the blade 100, regardless of the change in positional relation of the towing part 2 relative to the blade 100 to be removed.

The blade removal method according to an embodiment further includes a first turning part movement step of moving the first turning part 4 along the circumferential direction in accordance with movement of the blade 100 in the blade movement step.

In this case, after the first turning part movement step, the blade movement step is repeatedly performed.

According to this method, the first turning part 4 is moved in the circumferential direction in accordance with movement of the blade 100. Thus, by locating the first turning part 4 at a proper position in accordance with the position of the blade 100, it is possible to smoothly remove the blade 100 when the blade 100 is moved again.

As shown in FIG. 6(a), when the blade 100 is positioned near a rear end 210 in the removal direction C, radial component increases in the force applied to the first turning part 4 from the towing part 2. Accordingly, the force in a direction in which the first turning part 4 is away from the blade ring 200 increases. In this case, the first turning part 4 may be engaged with the recessed groove 202 of the blade ring 200 while a base part of the first turning part 4 may be fastened to the blade ring 200 with a bolt.

On the other hand, as shown in FIG. 6(b), when the blade 100 is positioned near a front end 212 in the removal direction C, radial component decreases, and circumferential component increases in the force applied to the first turning part 4 from the towing part 2. Accordingly, the force in a direction in which the first turning part 4 is away from the blade ring 200 decreases. In this case, the first turning part 4 can be fixed by only engaging the first turning part 4 with the recessed groove 202 of the blade ring 200.

If the blade 100 further approximates to the front end 212 in the removal direction C, the blade 100 may be directly pulled by the towing part 2 without intervention of the first turning part 4.

In an embodiment, the blade removal method further includes a frame attachment step of attaching a frame 5 supporting the towing part 2 to the blade ring 200 so as to bridge both ends 210, 212 of the blade ring 200 which has been divided into an arc segment.

With this method, since the frame 5 supporting the towing part 2 is attached to the divided blade ring 200, the reaction force which acts on the towing part 2 (reaction force to the tensile force of the blade 100) can be received by the frame 5. This enables the blade 100 to be removed while ensuring loading balance which acts on the blade ring 200, without strongly fixing the blade ring 200 to a base or the like.

In an embodiment, as shown in FIG. 1, if the frame 5 includes a pair of strut parts 51, 52 respectively connected to both ends 210, 212 of the blade ring 200, and a support rod 54 disposed so as to bridge the pair of strut parts 51, 52 and supporting the towing part 2, the blade removal method may further include a towing part positioning step.

In the towing part positioning step, the towing part 2 is moved along the support rod 54, and the towing part 2 is positioned in accordance with a position of the blade 100.

This method enables the towing part 2 supported by the support rod 54 to be separated from the ends of the blade ring 200 by the pair of strut parts 51, 50. Thus, it is possible to smoothly remove the blade even if the blade reaches a position close to the ends of the blade ring 200.

In addition, moving and positioning the towing part 2 in accordance with the position of the blade prevents excessive load from being applied to the frame 5.

Assuming that one end 210 of the blade ring 200 is 0 degree and the other end 212 is 180 degrees, a region where the towing part 2 can be moved along the support rod 54 may be an axial region corresponding to an angle region of at least 45 degrees or more and 135 degrees or less.

As shown in FIG. 5, in an embodiment, if the subject to be removed from the blade ring 200 is a stationary vane block 110 including a plurality of stationary vanes 100, the blade removal method further includes a locking member installment step of installing a locking member 8 between the stationary vanes 100.

In the locking member installment step, the locking member 8 is installed between adjacent stationary vanes 100 of the stationary vane block 110 so that the locking member 8 at least partially projects from between the adjacent stationary vanes 100.

In this case, in the string member connection step, the string member 3 is connected to the stationary vane block 110 on a blade root side of the stationary vanes 100 from a projection of the locking member 8.

The stationary vane block 110 may be configured so that it can be stacked in multiple stages in the height direction. In this configuration, the stationary vane block 110 can also be applied to blades 100 having different heights.

In the above method, before the blade 100 is removed from the towing part 2, the locking member is installed between the adjacent stationary vanes 100, and the string member 3 is connected to the stationary vane block 110 on a blade root side of the stationary vanes 100 from a projection of the locking member 8. Thus, it is possible to prevent the string member 3 from detaching from the blade when the blade is pulled by the towing part 2.

As described above, according to at least some embodiments of the present invention, the direction of the towing force due to the towing part 2 is changed by the first turning part 4 and then transmitted to the blade. Thus, by locating the first turning part 4 at a proper position relative to the blade to be removed, it is possible smoothly remove the blade, regardless of the change in positional relation of the towing part 2 relative to the blade to be removed.

Embodiments of the present invention were described in detail above, but the present invention is not limited thereto, and various amendments and modifications may be implemented.

For instance, while the above embodiments show the case where the blade removal device 1 includes only the first turning part 4 between the towing part 2 and the blade 100, other turning parts may be provided in addition to the first turning part 4.

Figure 7:
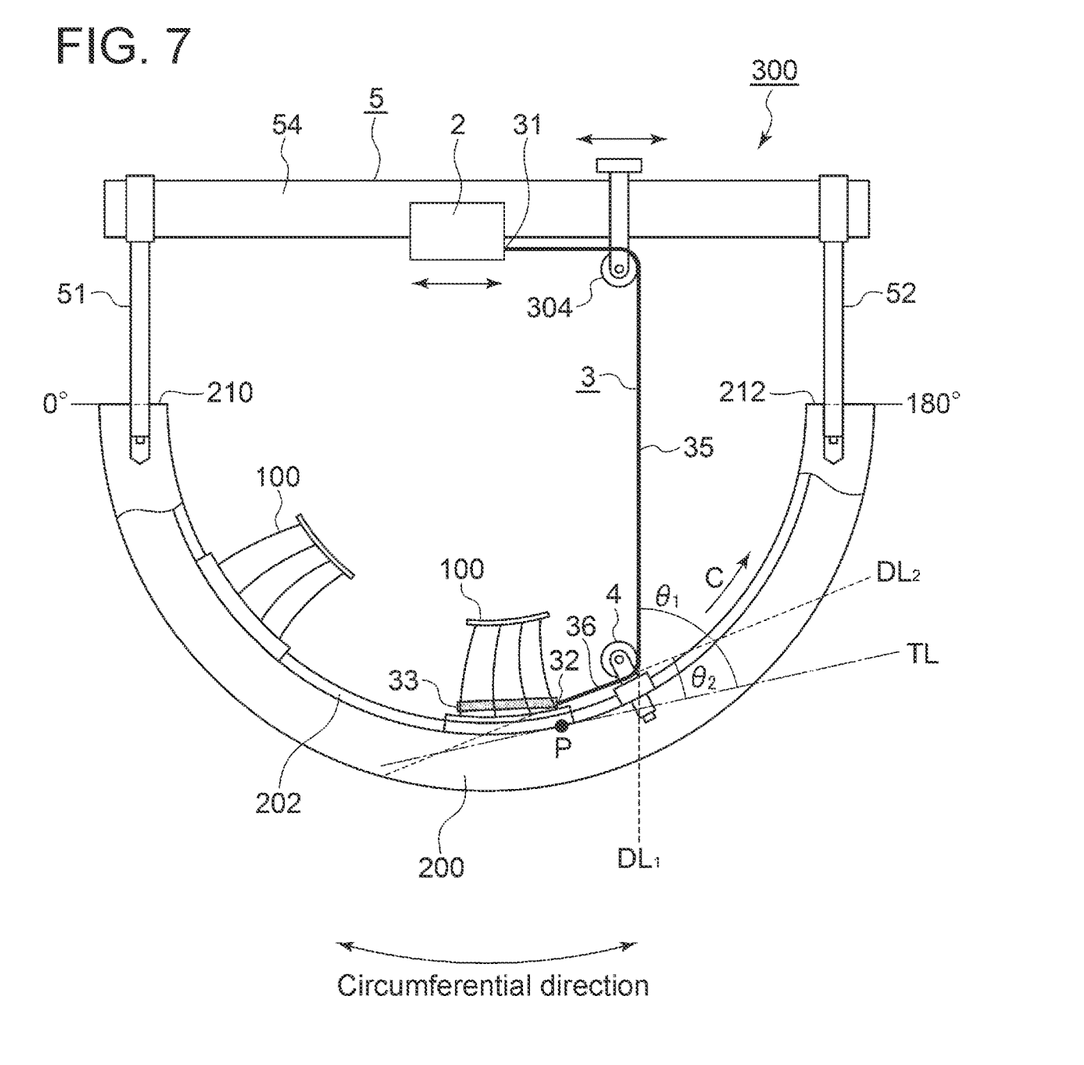
FIG. 7 is an overall configuration diagram showing a blade removal device to which a blade ring is attached according to an embodiment.

FIG. 7 is an overall configuration diagram showing a blade removal device to which a blade ring is attached according to another embodiment. The same reference numerals are used for indicating identical or corresponding components in FIG. 7 as in the above blade removal device 1, and their details will not be elaborated upon.

The blade removal device 300 shown in FIG. 7 further includes, in addition to the configuration of the blade removal device 1 shown in FIG. 1, a second turning part 304 attached to the frame 5. The second turning part 304 is in contact with a portion of the string member 3 between the towing part 2 and the first turning part 4. Thus, the blade removal device 300 includes the first turning part 4 and the second turning part 304 between the blade 100 and the towing part 2 so that the direction of the towing force due to the towing part 2 is changed by the second turning part 304 and the first turning part 4. Specifically, the towing force due to the towing part 2 is turned by the second turning part 304 from a towing direction along the string member 3 between the towing part 2 and the second turning part 304 to a towing direction (first towing direction $DL_1$) along the string member 3 between the second turning part 304 and the first turning part 4. Further, the towing force in the first towing direction $DL_1$ is turned at the first turning part 4 into a second towing direction $DL_2$ along the string member 3 between the first turning part 4 and the blade 100. In the example shown in FIG. 7, the second towing direction $DL_2$ is closer to a tangential direction of the blade ring 200 than the first towing direction $DL_1$ is ($\theta_1 > \theta_2$).

With the above configuration, the second turning part 304 attached to the frame 5 improves the flexibility of orientation of the towing part 2 and reduces a space required for installing the towing part 2, thus making the frame 5 compact, compared with a case without the second turning part 304. For instance, as shown in FIG. 7, if the towing part 2 is oriented along the support rod 54 of the frame 5, it is unnecessary to make a space for a sling or the like of the towing part 2 in a direction along the strut parts 51, 52 of the frame 5, and it is possible to shorten the strut parts 51, 52.

The second turning part 304 may be attached to the support rod 54 of the frame 5, as shown in FIG. 7. Alternatively, in other embodiments, the second turning part 304 is attached to the strut part 52 disposed downstream in the blade removal direction C, among the pair of strut parts 51, 52 of the frame 5.

A specific configuration of the second turning part 304 may be the same as the above-described first turning part 4. That is, the second turning part 304 may be a rotatable pulley configured to be in contact with the string member 3 or may be a sliding member configured to be in contact with the string member 3.

In some embodiments, at least the second turning part 304 is attached to the support rod 54 so as to be movable in a direction along the support rod 54 of the frame 5. For instance, the second turning part 304 may be configured to be movable in the direction along the support rod 54 under guidance by a guide rail provided on the support rod 54.

By moving the second turning part 304 in response to the change in position of the blade 100, the direction of the towing force transmitted through a portion of the string member 3 from the second turning part 304 to the blade 100 can be kept within a proper range. When the second turning part 304 is moved, the position of the second turning part 304 can be appropriately determined in accordance with the position of the blade 100 or the first turning part 4. In FIG. 7, the second turning part 304 is positioned so that the string member 3 between the second turning part 304 and the first turning part 4 extends along the strut parts 51, 52. However, the configuration of the second turning part 304 is not limited to this embodiment. The position of the second turning part 304 may be determined, for instance, so as to reduce a load applied to the frame 5 via the second turning part 304 or reduce a load applied to the first turning part 4, the blade 100, the blade ring 200, or other components via the string member 3.

On the other hand, the towing part 2 may be attached to the support rod 54 so as to be movable in a direction along the support rod 54 of the frame 5 as the second turning part 304 is. Alternatively, in a case where the second turning part 304 is movable in a direction along the support rod 54, the towing part 2 may be fixed to a position closer to the strut part 51 disposed upstream in the blade removal direction C, among the pair of strut parts 51, 52 of the frame 5.

When the blade 100 is removed by the blade removal device 300 with the above configuration, as well as the first turning part 4 is attached to the blade ring 200 (above-described first turning part attachment step), the second turning part 304 is attached to the frame 5 so as to be in contact with a portion of the string member 3 between the towing part 2 and the first turning part 4 (second turning part attachment step). Then, the towing direction of the towing force due to the towing part 2 is successively changed by the second turning part 304 and the first turning part 4, and the blade 100 is moved in the circumferential direction of the blade ring 200 by the towing part 2 via the string member 3.

In this way, the second turning part 304 attached to the frame 5 improves the flexibility of orientation of the towing part 2 and reduces a space required for installing the towing part 2, thus making the frame 5 compact, compared with a case without the second turning part 304.

In accordance with movement of the blade 100, the second turning part 304 may be moved along the support rod 54 of the frame 5 while the position of the first turning part 4 is changed in the circumferential direction of the blade ring 200. Likewise, the towing part 2 may be moved along the support rod 54 of the frame 5 in accordance with the position of the blade 100. Alternatively, without shifting the towing part 2 during the blade removal operation, the towing part 2 may be fixed to a position closer to the strut part 51 disposed upstream in the blade removal direction C, among the pair of strut parts 51, 52 of the frame 5, viewed from the first turning part 4.

Figure 8:
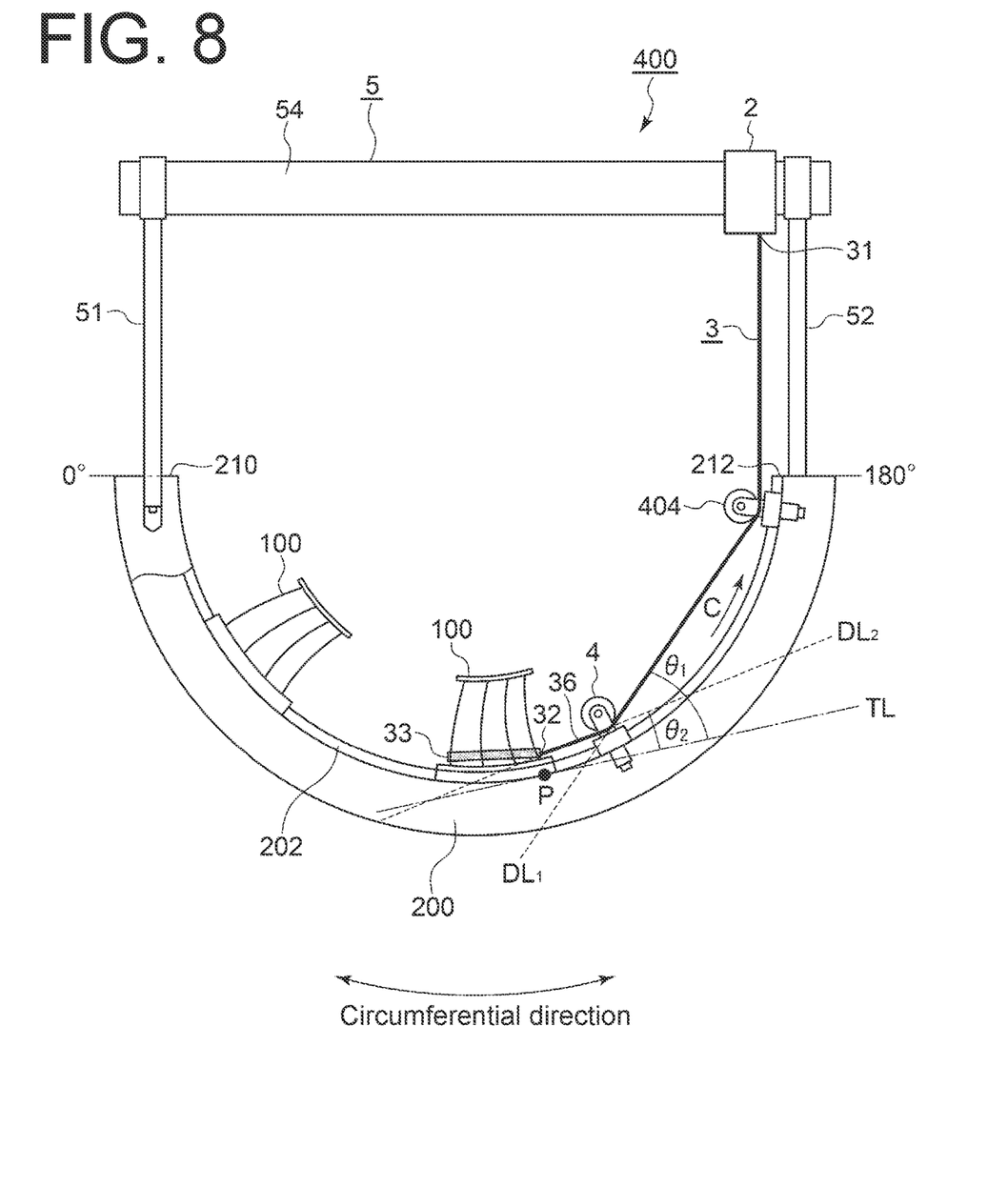
FIG. 8 is an overall configuration diagram showing a blade removal device to which a blade ring is attached according to an embodiment.

FIG. 8 is an overall configuration diagram showing a blade removal device to which a blade ring is attached according to still another embodiment. The same reference numerals are used for indicating identical or corresponding components in FIG. 8 as in the above blade removal device 1, and their details will not be elaborated upon.

The blade removal device 400 shown in FIG. 8 further includes, in addition to the configuration of the blade removal device 1 shown in FIG. 1, a third turning part 404 attached to one circumferential end of the blade ring 200. The third turning part 404 is in contact with a portion of the string member 3 between the towing part 2 and the first turning part 4. Thus, the blade removal device 400 includes the first turning part 4 and the third turning part 404 between the blade 100 and the towing part 2, so that the direction of the towing force due to the towing part 2 is changed by the third turning part 404 and the first turning part 4. Specifically, the towing force due to the towing part 2 is turned by the third turning part 404 from a towing direction along the string member 3 between the towing part 2 and the third turning part 404 to a towing direction (first towing direction $DL_1$) along the string member 3 between the third turning part 404 and the first turning part 4. Further, the towing force in the first towing direction DLL is turned at the first turning part 4 into a second towing direction $DL_2$ along the string member 3 between the first turning part 4 and the blade 100. In the example shown in FIG. 8, the second towing direction $DL_2$ is closer to a tangential direction of the blade ring 200 than the first towing direction $DL_1$ is ($\theta_1 > \theta_2$).

With the above configuration, the third turning part 404 attached to the circumferential end of the blade ring 200 comes into contact with a portion of the string member 3 between the towing part 2 and the first turning part 4, and thereby the direction of the towing force transmitted through a portion of the string member 3 from the third turning part 404 to the blade 100 can be kept within a proper range, regardless of the position of the blade 100. Thus, it is unnecessary to move the towing part 2 in accordance with movement of the blade 100 along the blade ring 200, and it is possible to efficiently conduct the blade removal operation.

A specific configuration of the third turning part 404 may be the same as the above-described first turning part 4. That is, the third turning part 404 may be a rotatable pulley configured to be in contact with the string member 3 or may be a sliding member configured to be in contact with the string member 3.

When the blade 100 is removed by the blade removal device 400 with the above configuration, as well as the first turning part 4 is attached to the blade ring 200 (above-described first turning part attachment step), the third turning part 404 is attached to the blade ring 200 so as to be in contact with a portion of the string member 3 between the towing part 2 and the first turning part 4 (third turning part attachment step). In this step, the third turning part 404 is attached to an end 212 disposed downstream in the blade removal direction C, among the pair of ends 210, 212 in the circumferential direction of the blade ring 200. Then, the towing direction of the towing force due to the towing part 2 is successively changed by the third turning part 404 and the first turning part 4, and the blade 100 is moved in the circumferential direction of the blade ring 200 by the towing part 2 via the string member 3.

In this way, by attaching the third turning part 404 to the circumferential end 212 of the blade ring 200 so as to be in contact with a portion of the string member 3 between the towing part 2 and the first turning part 4, the direction of the towing force (first towing direction $DL_1$) transmitted through a portion of the string member 3 from the third turning part 400 to the blade 100 can be kept within a proper range, regardless of the position of the blade 100. Thus, moving the first turning part 4 in accordance with movement of the blade 100 while the third turning part 404 is attached to the circumferential end 212 of the blade ring 200 enables the blade to be appropriately removed without moving the towing part 2 in accordance with movement of the blade 100 along the blade ring 200.

In a state where the positions of the towing part 2 and the third turning part 404 are fixed, if the blade 100 is approximated to the circumferential end 212 of the blade ring 200 while the position of the first turning part 4 is changed in accordance with the position of the blade 100, it becomes difficult to further move the first turning part 4 in the blade removal direction C. In this case, the first turning part 4 may be detached from the blade ring 200, the towing force due to the towing part 2 may be transmitted to the blade 100 by the third turning part 404, and the blade 100 may be further moved in the blade removal direction C. In this way, after the blade 100 is moved to the circumferential end 212 of the blade ring 200 (near the third turning part 404), the third turning part 404 may be detached from the blade ring 200, and the blade 100 may be removed from the blade ring 200.

In other embodiments, the second turning part 304 shown in FIG. 7 and the third turning part 404 shown in FIG. 8 may be used in combination with the first turning part 4. The number of each turning part (4, 304, 404) is not limited, and a plurality of turning parts (4, 304, 404) may be provided. In addition, an additional turning part other than the above-described turning parts (4, 304, 404) may be further provided, and the towing force due to the towing part 2 may be turned by the additional turning part and then transmitted to the blade 100.

Further, when the blade 100 is removed from the blade ring 200, the removal operation may be performed in a state where the blade ring 200 (and the frame 5) is horizontally placed on the ground or the like, or the removal operation may be performed in a state where the blade ring 200 (and the frame 5) is vertically held.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

REFERENCE SIGNS LIST

1 Blade removal device
2 Towing part
3 String member
4 First turning part
5 Frame
8 Locking member
31 First end
32 Second end
33 Connection part
35 First portion
36 Second portion
51, 52 Strut part
54 Support rod
100 Blade (stationary vane)
110 Stationary vane block
200 Blade ring
202 Groove or Recessed groove
204 Isolation ring
210 End
212 End
300, 400 Blade removal device
304 Second turning part
404 Third turning part

The invention claimed is:

1. A blade removal device for removing a blade in a circumferential direction of a blade ring along a groove, the blade including a blade body and an engaging portion which is configured to be engaged with the groove extending in the circumferential direction on an inner peripheral side of the blade ring, the blade removal device comprising:
a towing part for towing the blade;
a string member connecting the towing part and the blade body such that a first end of the string member is attached to the towing part and a second end of the string member, opposite to the first end, is connected to the blade body of the blade; and
a first turning part attached to the blade ring so as to be in contact with a portion of the string member between the towing part and the blade body to change a direction of a towing force transmitted via the string member.

2. The blade removal device according to claim 1, further comprising a frame attached to the blade ring so as to bridge both ends of the blade ring which has been divided into an arc segment, the frame supporting the towing part.

3. The blade removal device according to claim 2, wherein the frame includes:
a pair of strut parts respectively connected to both ends of the blade ring; and
a support rod disposed so as to bridge the pair of strut parts and supporting the towing part.

4. The blade removal device according to claim 3, wherein the towing part is configured to be slidable along the support rod.

5. The blade removal device according to claim 4, wherein the towing part is positioned so that a first towing direction along the string member between the towing part and the first turning part extends along the strut parts.

6. The blade removal device according to claim 2, further comprising a second turning part attached to the frame so as to be in contact with a portion of the string member between the towing part and the first turning part to change the direction of the towing force transmitted via the string member.

7. The blade removal device according to claim 1, further comprising a third turning part attached to one end of the blade ring in the circumferential direction so as to be in contact with a portion of the string member between the towing part and the first turning part to change the direction of the towing force transmitted via the string member.

8. The blade removal device according to claim 1,
wherein the first turning part is configured to change the direction of the towing force transmitted to the blade via the string member from a first towing direction along the string member between the towing part and the first turning part to a second towing direction along the string member between the first turning part and the blade, and
wherein the second towing direction is closer to a tangential direction of the blade ring than the first towing direction is.

9. The blade removal device according to claim 1, wherein the first turning part is engaged with a recessed groove formed along the circumferential direction in the blade ring or in an isolation ring mounted to the blade ring, and the first turning part is configured so as to be movable along the circumferential direction.

10. The blade removal device according to claim 1, wherein the first turning part is attached on an inner peripheral side of the blade ring so that the string member is positioned within a region where the blade is present in an axial direction of the blade ring.

11. The blade removal device according to claim 1, wherein the first turning part is a rotatable pulley configured to be in contact with the string member.

12. A blade removal method for removing a blade in a circumferential direction of a blade ring along a groove, the blade including a blade body and an engaging portion which is configured to be engaged with the groove extending in the circumferential direction on an inner peripheral side of the blade ring, the blade removal method comprising:
a string member connection step of connecting the blade body of the blade and a towing part for towing the blade with a string member such that a first end of the string member is attached to the towing part and a second end of the string member, opposite to the first end, is connected to the blade body of the blade;
a first turning part attachment step of attaching a first turning part, configured to change a direction of a towing force transmitted via the string member, to the blade ring so as to be in contact with a portion of the string member between the towing part and the blade body; and
a blade movement step of generating the towing force by the towing part and thereby moving the blade in the circumferential direction.

13. The blade removal method according to claim 12, further comprising a frame attachment step of attaching a frame supporting the towing part to the blade ring so as to bridge both ends of the blade ring which has been divided into an arc segment.

14. The blade removal method according to claim 13, wherein the frame includes:
- a pair of strut parts respectively connected to both ends of the blade ring; and
- a support rod disposed so as to bridge the pair of strut parts and supporting the towing part, and wherein the method further comprises a towing part positioning step of moving the towing part along the support rod and positioning the towing part in accordance with a position of the blade.

15. The blade removal method according to claim 13, further comprising a second turning part attachment step of attaching a second turning part, configured to change the direction of the towing force transmitted via the string member, to the frame so as to be in contact with a portion of the string member between the towing part and the first turning part.

16. The blade removal method according to claim 12, further comprising a first turning part movement step of moving the first turning part along the circumferential direction in accordance with movement of the blade in the blade movement step,
wherein the blade movement step is repeated after the first turning part movement step.

17. The blade removal method according to claim 16, further comprising a third turning part attachment step of attaching a third turning part, configured to change the direction of the towing force transmitted via the string member, to one end of the blade ring in the circumferential direction so as to be in contact with a portion of the string member between the towing part and the first towing part,
wherein the first turning part movement step is performed in a state where the third turning part is attached to the one end of the blade ring after the third turning part attachment step.

18. The blade removal method according to claim 12,
wherein a subject to be removed from the blade ring is a stationary vane block including a plurality of stationary vanes,
wherein the method further comprises a locking member installment step of installing a locking member between adjacent stationary vanes of the stationary vane block so that the locking member at least partially projects from between the adjacent stationary vanes, and
wherein, in the string member connection step, the string member is connected to the stationary vane block on a blade root side of the stationary vanes from a projection of the locking member.

19. The blade removal method according to claim 12,
wherein, in the first turning part attachment step, the first turning part is attached to the blade ring so that the towing force is turned from a first towing direction along the string member between the towing part and the first turning part to a second towing direction along the string member between the first turning part and the blade, and
wherein the second towing direction is closer to a tangential direction of the blade ring than the first towing direction is.

20. A blade removal device for removing a blade in a circumferential direction of a blade ring along a groove, the blade being engaged with the groove that extends in a circumferential direction on an inner peripheral side of the blade ring, the blade removal device comprising:
- a towing device including a chain block, a lever hoist, a crane or a hoist;
- a connecting member including a string, a sling, a rope or a wire which is disposed between the blade and the towing device so as to connect the blade and the towing device; and
- a rotatable pulley attached to the blade ring so to be in contact with the connecting member and configured to change a direction of a towing force transmitted from the towing device via the connecting member.

* * * * *